United States Patent [19]

Sarvanne

[11] 4,193,604
[45] Mar. 18, 1980

[54] MEANS FOR CARRYING A CABLE THROUGH A WALL

[75] Inventor: Hannu Sarvanne, Vantaa, Finland

[73] Assignee: Oy. E. Sarlin Ab, Helsinki, Finland

[21] Appl. No.: 945,194

[22] Filed: Sep. 21, 1978

[30] Foreign Application Priority Data

Mar. 17, 1978 [FI] Finland .................................. 780855

[51] Int. Cl.² ................................................ F16B 7/02
[52] U.S. Cl. ....................................... 277/117; 174/79;
174/84 C; 277/190
[58] Field of Search ................ 277/190, 114–122,
277/101, 209; 174/79, 65 R, 65 G, 65 SS, 84 C

[56] References Cited

U.S. PATENT DOCUMENTS

| | | | |
|---|---|---|---|
| 1,583,107 | 5/1926 | Badeker | 277/122 |
| 1,658,935 | 2/1928 | Munch | 277/122 |
| 2,333,196 | 11/1943 | Price | 277/118 |
| 2,831,714 | 4/1958 | Thorburn | 277/117 |
| 3,260,786 | 7/1966 | Katzschner | 174/65 R |
| 3,558,799 | 1/1971 | Lee | 174/84 C |
| 3,827,704 | 8/1974 | Gillemot | 174/65 G |
| 3,858,992 | 1/1975 | Eucker | 174/79 |

*Primary Examiner*—Robert I. Smith
*Attorney, Agent, or Firm*—Haseltine, Lake & Waters

[57] ABSTRACT

Means for carrying a cable through a wall, for instance through the wall of the motor of a submerged pump, said means comprising a sealing rubber ring encircling the cable and which is tightened up with an annular sleeve to give a watertight seal between the motor wall and the cable. Between the sleeve and the wall has been mounted a tightening ring encircling the cable, this ring carrying members which bend towards the cable in connection with the tightening operation.

1 Claim, 3 Drawing Figures

MEANS FOR CARRYING A CABLE THROUGH A WALL

BACKGROUND OF INVENTION

It is necessary in submerged pumps to carry the electric cable in watertight fashion through the motor frame, and higher requirements than normal are also imposed on this inlet arrangement in the particular respect that the cable must not slide in the inlet if it should be pulled for one reason or another. There are cases in which people have tried to lift the submerged pump by its cable.

SUMMARY OF INVENTION

The object of the invention is to provide a means of a new type for the carrying-through of a cable and which at the same time both seals the cable inlet point and also clamps the cable so that it is not allowed to slip.

The means of the invention is characterized in that between the sleeve and the wall has been mounted a clamping ring encircling the cable, this ring presenting members which bend towards the cable in connection with the tightening. By virtue of the invention is it achieved that in association with the mounting of the sealing rubber ring the cable will also be uniformly clamped to be stationary so that it cannot slide at the intake. The cable intake according to the present invention has been subjected in tests to a load of about 120 kp acting on the cable, and no sliding at the intake has then occurred.

A favourable embodiment of the invention is characterized in that the sleeve has conical surfaces, owing to the tightening effect of which the members bend towards the cable. This is a simple solution, by which the members are made to press on the cable with sufficient force.

Another embodiment of the invention is characterized in that to the tightening ring have been affixed two members, the space between them being consistent, before tightening, in size and shape with the cross section of the cable. Therefore it is easy to push the tightening ring over the cable before it is tightened into place, and in connection with the tightening operation the cable is clamped uniformly between the members, being supported by the sleeve.

A third embodiment of the invention is characterized in that the tightening ring consists of a sleeve tightening the rubber ring and of a flange resting against the wall. It is thereby possible to keep the tightening force constant which acts on the rubber ring.

A fourth embodiment of the invention is characterized in that the shape of the hole in the sleeve is a cone cut on the side, whereby the cable will be clamped uniformly all around, without being pushed into any slit between members.

IN THE DRAWING

The invention shall be described with the aid of an example, with reference being made to the attached drawing, wherein:

FIG. 1 presents the motor of a submerged pump, sectioned.

DESCRIPTION OF INVENTION

Figure 1:
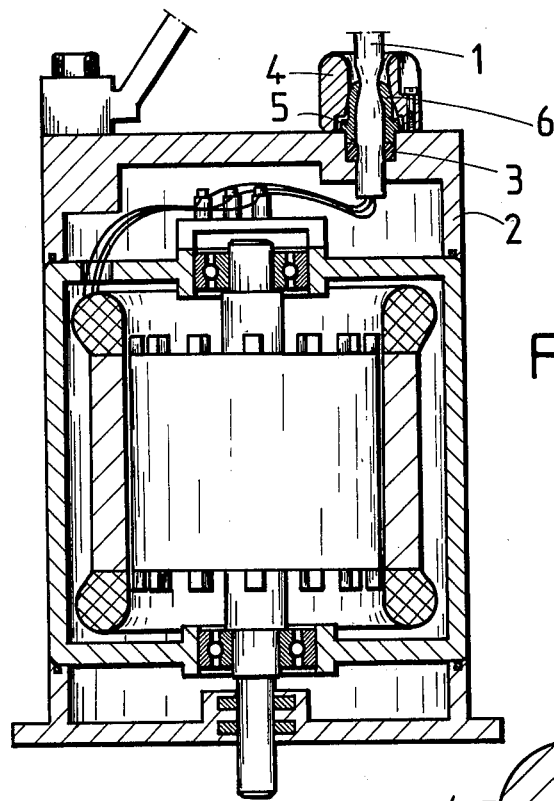
Figure 2:
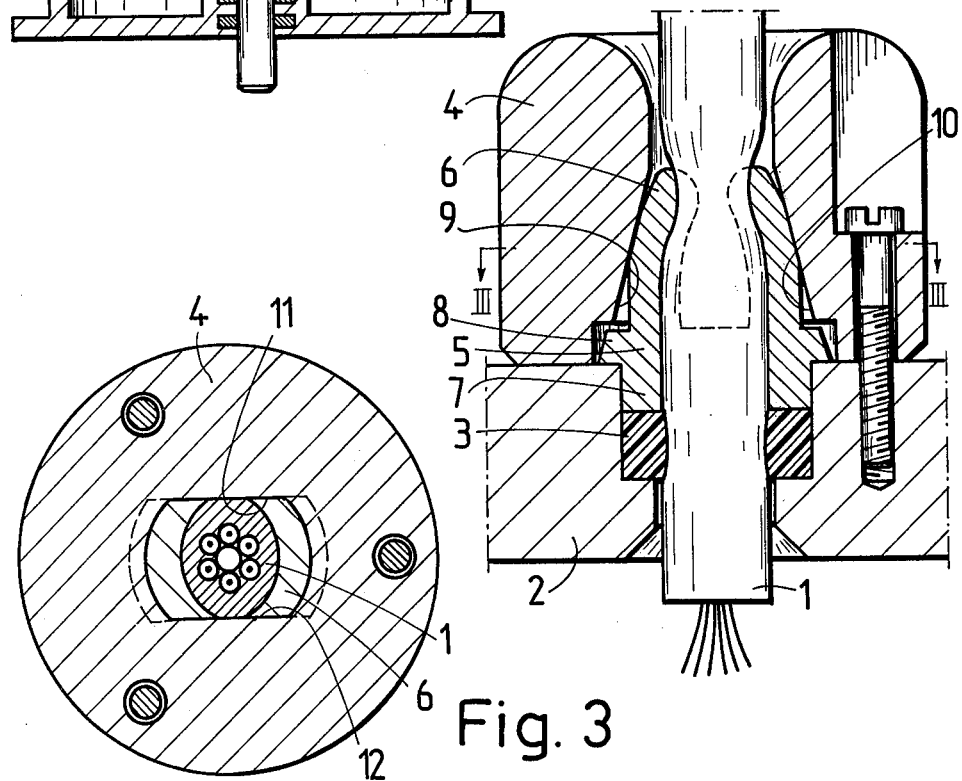
FIG. 2 shows the situation when the cable is carried through, enlarged.
Figure 3:
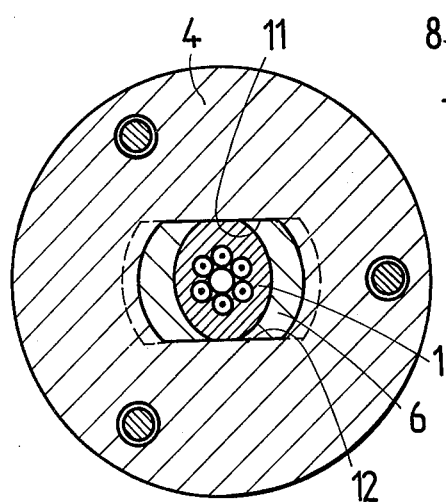
FIG. 3 shows the section carried along line III—III in FIG. 2.

The means by which the cable 1 is carried through the motor wall 2 comprises a sealing rubber ring 3 encircling the cable, this ring being tightened by means of an annular sleeve 4 to seal water-tightly between the motor wall and the cable. Between the sleeve 4 and the wall 2 there has been mounted a tightening ring 5 encircling the cable 1, this ring carrying two members 6 which in connection with the tightening operation bend towards the cable. The sleeve 4 has conical surfaces by whose tightening action the members 6 bend towards the cable. The conical surfaces 9,10 are confined by mutually parallel plane faces 11,12. The space remaining between the members 6 before tightening is consistent in size and shape with the cross section of the cable 1. The tightening ring 5 is composed of a sleeve 7 tightening the rubber ring 3 and of a flange 8 resting against the wall 2.

By the aid of the means of the invention, the cable intake can be positively sealed with the aid of a rubber ring and it is also possible to clamp the cable with the aid of the tightening ring 5 to be stationary so that it cannot slide at the intake.

It is obvious to a person skilled in the art that the invention is not confined to the examples presented, but that it may vary within the scope of the claims following below. For instance, the number of bendable members 6 affixed to the tightening ring 5 may as well be more than two.

I claim:

1. An apparatus for carrying a cable through a wall, such as a motor wall, comprising: a sealing ring encircling said cable disposed between said motor wall and said cable to form a water tight condition therebetween; an elongated clamping member, said clamping member is in proximity to said sealing ring, abutting said wall to surround said cable, said clamping member being further defined by integral gripping portions to engage said cable, said gripping portions having outer sloping surfaces; and an outer sleeve; said outer sleeve is disposed about said clamping member and is provided with interior sloping surfaces for co-action with said sloping surfaces of said clamping member to urge said gripping elements into gripping engagement with said cable when said clamping member is tightened.

* * * * *